United States Patent [19]

Umemoto

[11] Patent Number: 4,862,988
[45] Date of Patent: Sep. 5, 1989

[54] FOUR WHEEL DRIVE WORKING VEHICLE

[75] Inventor: Tomeo Umemoto, Sakai, Japan

[73] Assignee: Kubota, Ltd., Osaka, Japan

[21] Appl. No.: 215,568

[22] Filed: Jul. 6, 1988

[30] Foreign Application Priority Data

Jul. 14, 1987 [JP] Japan .................... 62-175601
Jul. 14, 1987 [JP] Japan .................... 62-175602

[51] Int. Cl.⁴ .................................. B60K 17/34
[52] U.S. Cl. ........................... 180/246; 74/15.4;
  180/250; 192/87.18
[58] Field of Search .............. 74/15.4, 15.86;
  180/233, 247, 248, 249, 250, 246, 245;
  192/87.14, 87.18

[56] References Cited

U.S. PATENT DOCUMENTS

| 3,232,125 | 2/1966 | Lee et al. | 74/15.86 |
| 4,286,686 | 9/1981 | Franke | 180/233 |
| 4,574,910 | 3/1986 | Miki et al. | 180/249 |
| 4,696,365 | 9/1987 | Ishimori et al. | 180/233 |
| 4,716,775 | 1/1988 | Horii et al. | 74/15.4 X |
| 4,723,622 | 2/1988 | Toshikuni et al. | 180/233 |
| 4,723,623 | 2/1988 | Teraoka et al. | 180/233 |
| 4,768,602 | 9/1988 | Inoue et al. | 180/233 X |

FOREIGN PATENT DOCUMENTS 150830 7/1986 Japan .

Primary Examiner—David M. Mitchell
Assistant Examiner—Michael Mar
Attorney, Agent, or Firm—Webb, Burden, Ziesenheim & Webb

[57] ABSTRACT

A four wheel drive working vehicle comprises a first shaft for driving rear wheels, and a second shaft for driving front wheels. The first and second shafts are coaxially and relatively rotatably supported by a transmission case. The first shaft carries a first gear relatively rotatably mounted thereon, and the second shaft carries a second gear fixed thereto. A gear transmission unit is detachably bolted to the transmission case to transmit drive from the first gear to the second gear. A clutch device is mounted on the first shaft to be switchable between a position to directly interconnect the first shaft and the second gear for driving the front and rear wheels at the same speed, and a position to directly interconnect the first shaft and the first gear for driving the front wheels at a higher speed than the rear wheels.

9 Claims, 3 Drawing Sheets

FOUR WHEEL DRIVE WORKING VEHICLE

BACKGROUND OF THE INVENTION (1) Field of the Invention

The present invention relates to four wheel drive working vehicles and more particularly to a transmission structure for driving front wheels.

(2) Description of the Prior Art

In ordinary four wheel working vehicles, the front and rear wheels are driven at substantially the same speed. In recent years, however, certain types of agricultural tractor have been in practial use which include a front wheel transmission structure for driving the front wheels in a plurality of speeds. One such transmission structure is disclosed in Japanese Patent Publication Kokai No. 61-150830.

The front wheel transmission structure disclosed therein comprises a standard gear transmission for driving the front and rear wheels at substantially the same speed, an accelerating gear transmission for driving the front wheels at a higher speed than the rear wheels, and a hydraulic clutch acting as a switching device for selecting between the standard gear transmission and the accelerating gear transmission for driving the front wheels. The front wheels are driven at the higher speed than the rear wheels to enable the tractor to make a small sharp turn with ease even on a soft ground.

According to this transmission structure, the acceleration ratio of the front wheels with respect to the rear wheels are primarily determined by the gear ratio of the accelerating gear transmission. Therefore, the gear ratio of the accelerating gear transmission must be changed in order to change the acceleration ratio. Such a change necessitates rear-rangement of components of the front wheel transmission structure and a change in the shape of a casing that houses the front wheel transmission structure. Thus, a change in the acceleration ratio in the known structure requires great trouble. When the specification of the transmission structure is changed to provide different acceleration ratios, the change in the specification results in a great increase in manufacturing cost.

SUMMARY OF THE INVENTION

The object of the present invention is to provide a transmission structure capable of effecting different acceleration ratios with ease and manufactured at low cost.

This object is achieved according to the present invention by a four wheel drive working vehicle comprising a first transmission shaft operatively connected to a transmission system for driving rear wheels, a second transmission shaft operatively connected to a transmission system for driving front wheels, the first and second transmission shafts being coaxially and relatively rotatably supported, a first gear relatively rotatably mounted on the first transmission shaft, a second gear fixed to the second transmission shaft, a transmission case, a gear transmission unit disposed between and transmitting drive from the first gear to the second gear, and clutch means mounted on the first transmission shaft and switchable between a first mode to directly interconnect the first transmission shaft and the second gear for driving the front wheels and the rear wheels at the same speed, and a second mode to directly interconnect the first transmission shaft and the first gear for driving the front wheels at a higher speed than the rear wheels, wherein the gear transmission unit is removably attached to the transmission case.

According to the above construction, the front and rear wheels are driven substantially at the same speed when the first and second transmission shafts are directly interconnected by the clutch means. When the first gear is fixed to the first transmission shaft, the drive is transmitted from the first transmission shaft to the second gear through the first gear and the gear transmission unit, whereby the front wheels are accelerated.

The front wheel acceleration ratio may be changed in the accelerated stage by changing the transmission ratio in the gear transmission unit. That is, a plurality of gear transmission units having different transmission ratios are made available which are interchangeably attached to the transmission case housing the first and second transmission shafts. This feature allows the four wheel drive working vehicle to have different front wheel acceleration ratios without the trouble of changing the transmission case and rearranging the components of the front wheel transmission.

As described above, the change in the specification for providing different front wheel acceleration ratios according to the present invention necessitates minimum changes in the other components. Thus, the front wheel transmission is manufactured at low cost.

In a preferred embodiment of the invention, the clutch means includes a first and a second switching devices comprising hydraulic clutches or claw clutches. This construction is compact and lightweight and yet is capable of changing the front wheel acceleration ratios reliably.

In a further embodiment, the switching devices comprise hydraulic clutches mounted on the first transmission shaft. These hydraulic clutches are operable through a hydraulic passage structure including a joint relatively rotatably fitted on the first transmission shaft. The first transmission shaft or the joint defines annular oil passages at a position fitting each other. These annular oil passages communicate with further oil passages defined through the first transmission shaft. The hydraulic passage structure further includes pipes extending from the transmission case to the joint for feeding pressure oil from a pump to the annular oil passages.

According to this construction, the pressure oil from the pump flows through the pipes, the joint and the annular oil passages to the further oil passages defined through the first transmission shaft. These pipes also act to lock the joint against rotation and to maintain the joint in position relative to the first transmsission shaft.

Consequently, the joint need not include a special flange for fixing the joint to the transmission case and the transmission case need not include a mounting seat for supporting the joint. This enables an existing joint to be fixed to an existing transmission case without modifying their shapes. Thus, the transmission structure according to the present invention is simpler and less expensive than the known transmission structure.

Other features and advantages of the invention will be apparent from the following description.

BRIEF DESCRIPTION OF THE DRAWINGS

The drawings illustrate a four wheel drive working vehicle embodying the present invention, in which.

DESCRIPTION OF THE PREFERRED EMBODIMENTS

A four wheel drive agricultural tractor according to one embodiment of the present invention will be described hereinafter with reference to the drawings.

Figure 1:
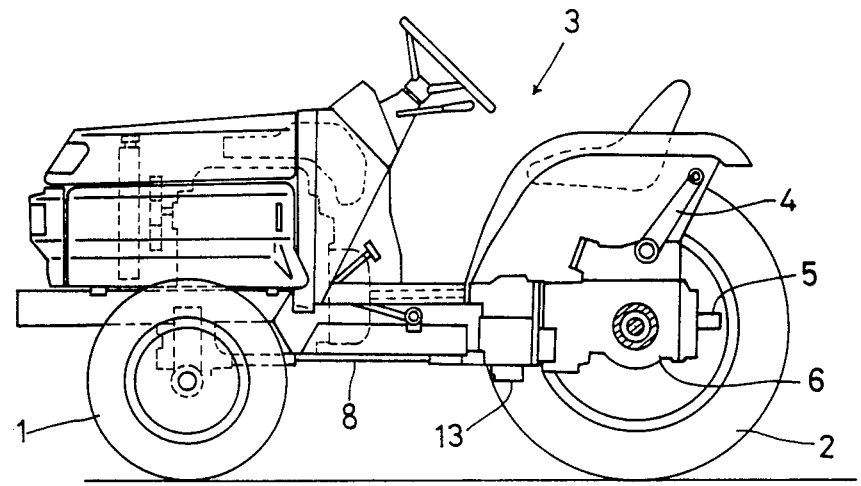
FIG. 1 is a side elevation of an agricultural tractor.

As shown in FIG. 1, the agricultural tractor comprises steerable front wheels 1, rear wheels 2, a driver's section 3 disposed on a chassis supported by the front and rear wheels, a lift arm 4 for raising and lowering a working implement connected to the rear of the tractor, and a PTO shaft 5 for driving the working implement.

Figure 2:
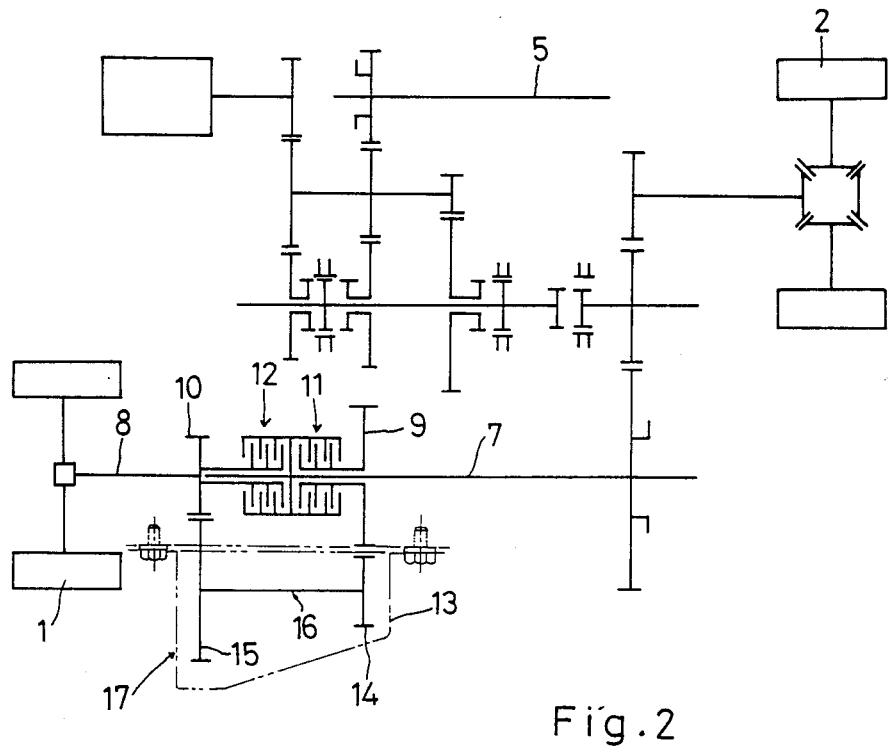
FIG. 2 is a diagram of a transmission system of the tractor.
Figure 3:
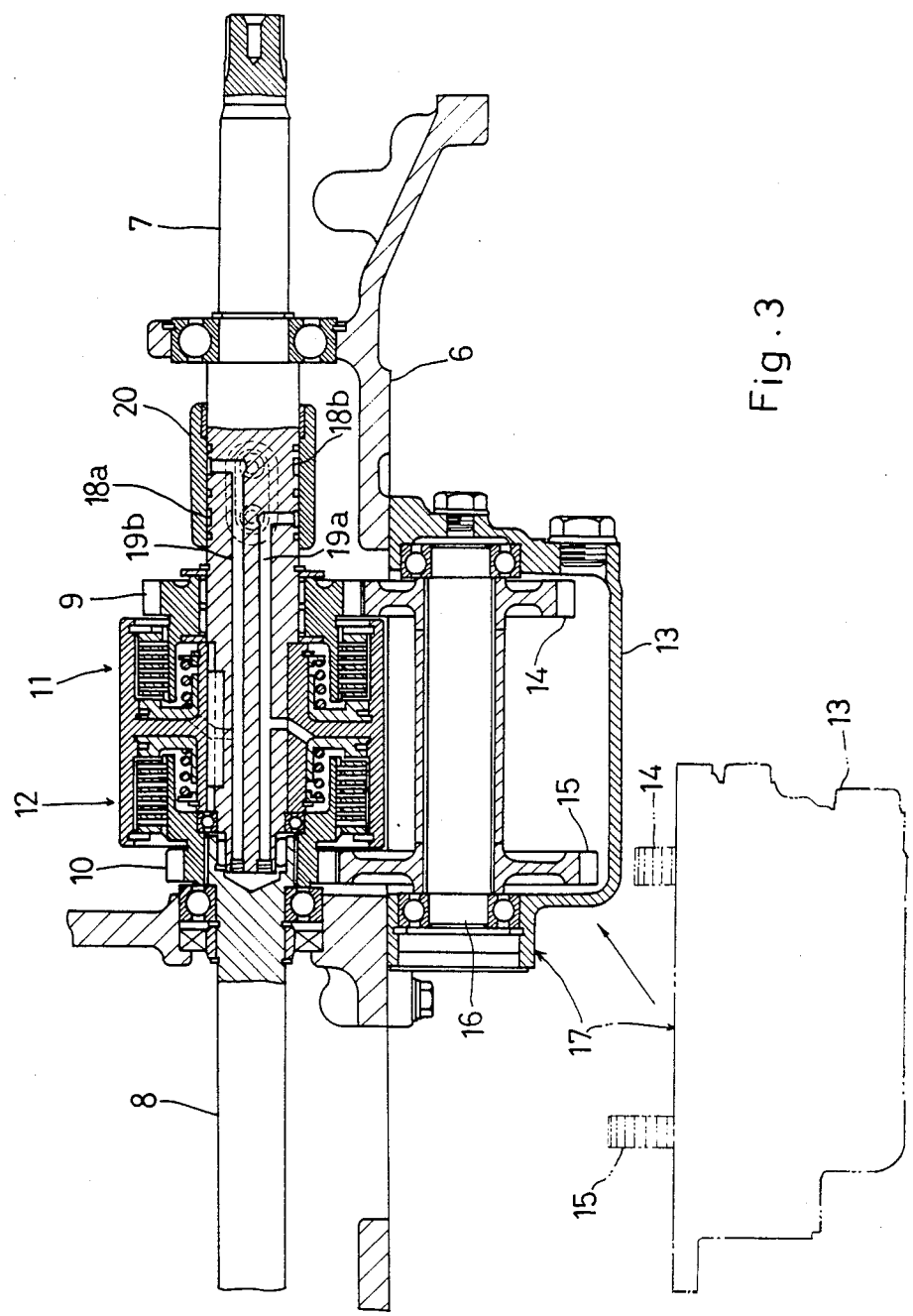
FIG. 3 is a side view in vertical section of a transmission structure for driving front wheels.

FIG. 2 schematically shows a transmission system of the tractor. A transmission case 6 includes a change speed device for effecting change speed and transmitting drive to the rear wheels 2. The drive is branched off at the change speed device for transmission to a first transmission shaft 7 as shown in FIG. 2. FIG. 3 shows a principal portion of the transmission system according to the invention. The transmission case 6 supports a second transmission shaft 8 to be coaxial with and rotatable relative to the first transmission shaft 7 for transmitting the drive to the front wheels 1. The first transmission shaft 7 carries a first gear 9 relatively rotatably mounted thereon. The second transmission shaft 8 carries a second gear 10 splined thereto. A first hydraulic clutch 11 is provided between the first transmission shaft 7 and first gear 9 to act as a first switching device. A second hydraulic clutch 12 is provided between the first transmission shaft 7 and second gear 10 to act as a second switching device. The first gear (9) includes a multi-plate portion partly forming the first hydraulic clutch (11) and extends from a base end thereof toward the second transmission shaft (8). Likewise, the second gear (10) includes a multi-plate portion partly forming the second hydraulic clutch (12) and extends from a base end thereof toward the first transmission shaft (7), whereby the first gear portion and the second gear portion are positioned on opposite sides of the first hydraulic clutch (11)/second hydraulic clutch (12) arrangement as shown in FIG. 3.

The first and second clutches 11 and 12 are housed in a single casing mounted on the first transmission shaft 7, and the first and second gears 9 and 10 associated with the first and second clutches 11 and 12, respectively, are disposed at opposite ends of the casing axially of the first transmission shaft 7.

As shown in FIG. 3, the first and second gears 9 and 10 are meshed with a third and a fourth gears 14 and 15, respectively, fixed to a third transmission shaft 16 supported in a unit case 13. The unit case 13 is detachably bolted to the transmission case 6. The third and fourth gears 14 and 15, the third transmission shaft 16 and the unit case 13 constitute a gear transmission unit 17.

When the second hydraulic clutch 12 is engaged, the first and second transmission shafts 7 and 8 are directly interconnected to drive the front wheels 1 at substantially the same speed as the rear wheels 2. When the first hydraulic clutch 11 is engaged, the drive is transmitted from the first transmission shaft 7 to the second transmission shaft 8 through the first gear 9, the third gear 14, the third transmission shaft 16 and the fourth gear 15 in the gear transmission unit 17, and the second gear 10. In this state, the front wheels 1 are driven at a higher speed than the rear wheels 2. The gear transmission unit 17 may be changed with another gear transmission unit having a different transmission ratio in order to change the speed for driving the front wheels 1 in the acceleration state.

In the foregoing embodiment, the first and second hydraulic clutches 11 and 12 are employed as the first and second switching devices. Alternatively, the switching device may comprise a shift member splined to the first transmission shaft 7. In this case the shift member is slidable to a position to engage the second gear 10 for directly interconnecting the first and second transmission shafts 7 and 8, and slidable in the opposite direction to engage the first gear 9 for locking the first gear 9 to the first transmission shaft 7.

Figure 4:
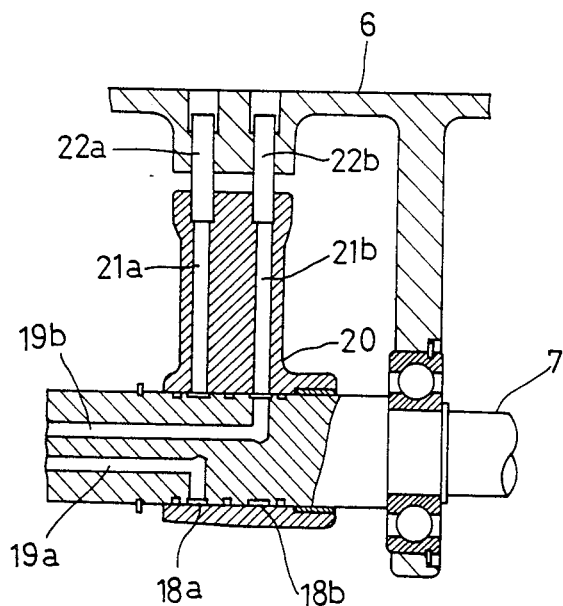
FIG. 4 is a plan view in cross section of a joint.

The first and second hydraulic clutches 11 and 12 are operable through a pressure oil feeding structure as shown in FIGS. 3 and 4. This structure includes two annular oil passages 18a and 18b defined peripherally of the first transmission shaft 7, and first oil passages 19a and 19b defined in the first transmission shaft 7 and extending from the annular oil passages 18a and 18b to the first and second hydraulic clutches 11 and 12, respectively. A joint 20 for forming part of a hydraulic circuit is relatively rotatably fitted on the first transmission shaft 7 at a position opposed to the annular oil passages 18a and 18b.

The joint 20 defines second oil passages 21a and 21b communicating with the annular oil passages 18a and 18b, respectively. Two pipes 22a and 22b are provided to extend from the transmission case 6 to the joint 20. Thus, pressure oil from a pump (not shown) is fed through the pipes 22a and 22b and through the second oil passages 21a and 21b in the joint 20 to the annular oil passages 18a and 18b. The pipes 22a and 22b act to lock the joint 20 against rotation and to hold it in position.

What is claimed is:

1. A four wheel drive working vehicle comprising:
   a transmission case containing:
   a first transmission shaft (7) operatively connected to a transmission system for driving rear wheels (2),
   a second transmission shaft (8) operatively connected to a transmission system for driving front wheels (1), the first and second transmission shafts (7, 8) being coaxially and relatively rotatably supported,
   a first gear (9) relatively rotatably mounted on the first transmission shaft (7),
   a second gear (10) fixed to the second transmission shaft (8), and
   clutch means mounted adjacent an end of the first transmission shaft (7) near the second transmission shaft (8), and including portions of the first gear (9) and second gear (10) on opposite sides thereof, the clutch means being selectively switchable between a first mode to directly interconnect the first transmission shaft (7) and the second gear (10) for driving the front wheels (1) and the rear wheels (2) at the same speed, and a second mode to directly interconnect the first transmission shaft (7) and the first gear (9); and
   a gear transmission unit (17) detachably mounted on the transmission case (6) below the clutch means for transmitting drive from the first gear (9) to the second gear (10) through a change speed mechanism when being attached thereto wherein said change speed mechanism includes a third gear (14) meshed with the first gear (9), a fourth gear (15) meshed with the second gear (10) and means for connecting said third gear (14) to said fourth gear

(15) whereby when said clutch means is switched to said second mode the front wheels (1) are driven at a higher speed than the rear wheels (2).

2. A four wheel drive working vehicle as claimed in claim 1 wherein the clutch means includes a first switching device for directly interconnecting the first transmission shaft (7) and the second gear (10), and a second switching device for directly interconnecting the first transmission shaft (7) and the first gear (9).

3. A four wheel drive working vehicle as claimed in claim 2 wherein the first and second switching devices comprise a first hydraulic clutch (11) and a second hydraulic clutch (12).

4. A four wheel drive working vehicle as claimed in claim 3 wherein the first and second hydraulic clutches are operable through a hydraulic structure comprising;
first oil passages (19a, 19b) defined in the first transmission shaft (7) to communicate with the first and second oil clutches,
a joint (20) relatively rotatably fitted on the first transmission shaft (7),
annular oil passages (18a, 18b) communicating with the first oil passages for supplying pressure oil to the first oil passages with the first transmission shaft in rotation,
second oil passages (21a, 21b) defined in the joint (20) to communicate with the annular oil passages (18a, 18b), and
oil feeding pipes (22a, 22b) extending from the transmission case (6) to the joint (20) for transmitting the pressure oil from a pressure source to the second oil passages (21a, 21b).

5. A four wheel drive working vehicle as claimed in claim 4 wherein the annular oil passages (18a, 18b) are defined in the first transmission shaft (7).

6. A four wheel drive working vehicle as claimed in claim 4 wherein the annular oil passages (18a, 18b) are defined in the joint (20).

7. A four wheel drive working vehicle as claimed in claim 2 wherein the first and second switching devices are defined in a single casing.

8. A four wheel drive working vehicle as claimed in claim 3 wherein the first gear (9) includes a multi-plate portion partly forming the first hydraulic clutch (11) and extending from a base end thereof toward the second transmission shaft (8), and the second gear (10) includes a multi-plate portion partly forming the second hydraulic clutch (12) and extending from a base end thereof toward the first transmission shaft (7).

9. A four wheel drive working vehicle as claimed in claim 1 wherein the change speed mechanism of the gear transmission unit (17) includes a third transmission shaft (16) having the third and fourth gears (14), (15) at opposite ends thereof.

* * * * *